United States Patent
Yang et al.

(10) Patent No.: US 8,584,233 B1
(45) Date of Patent: Nov. 12, 2013

(54) PROVIDING MALWARE-FREE WEB CONTENT TO END USERS USING DYNAMIC TEMPLATES

(75) Inventors: Liulin Yang, Nanjing (CN); Kun Lu, Nanjing (CN); Shiyu Xie, Nanjing (CN)

(73) Assignee: Trend Micro Inc., Tokyo (JP)

( * ) Notice: Subject to any disclaimer, the term of this patent is extended or adjusted under 35 U.S.C. 154(b) by 1014 days.

(21) Appl. No.: 12/115,388

(22) Filed: May 5, 2008

(51) Int. Cl.
 *G06F 11/00* (2006.01)
(52) U.S. Cl.
 USPC ............... 726/22; 726/24; 709/229; 713/152; 713/155; 713/175; 713/188
(58) Field of Classification Search
 USPC ......... 726/22, 24, 12; 709/229; 715/273, 200; 713/152, 155, 175, 188
 See application file for complete search history.

(56) References Cited

U.S. PATENT DOCUMENTS

| | | | |
|---|---|---|---|
| 7,055,175 B1* | 5/2006 | Le Pennec et al. | 726/24 |
| 7,096,500 B2* | 8/2006 | Roberts et al. | 726/24 |
| 7,490,353 B2* | 2/2009 | Kohavi | 726/22 |
| 7,647,636 B2* | 1/2010 | Polyakov et al. | 726/24 |
| 7,739,738 B1* | 6/2010 | Sobel et al. | 726/24 |
| 7,765,400 B2* | 7/2010 | Costea et al. | 713/165 |
| 7,849,507 B1* | 12/2010 | Bloch et al. | 726/22 |
| 8,015,611 B2* | 9/2011 | Haeffele et al. | 726/23 |
| 8,126,866 B1* | 2/2012 | Barton et al. | 707/706 |
| 8,151,352 B1* | 4/2012 | Novitchi | 726/24 |
| 8,196,205 B2* | 6/2012 | Gribble et al. | 726/24 |
| 8,302,192 B1* | 10/2012 | Cnudde et al. | 726/24 |
| 8,302,196 B2* | 10/2012 | Soderberg et al. | 726/25 |
| 8,375,444 B2* | 2/2013 | Aziz et al. | 726/23 |
| 8,429,746 B2* | 4/2013 | Capalik | 726/23 |
| 2003/0097591 A1* | 5/2003 | Pham et al. | 713/201 |
| 2005/0283603 A1* | 12/2005 | Raman et al. | 713/152 |
| 2006/0075494 A1* | 4/2006 | Bertman et al. | 726/22 |
| 2008/0127340 A1* | 5/2008 | Lee | 726/22 |
| 2008/0148403 A1* | 6/2008 | Manion et al. | 726/22 |
| 2009/0013405 A1* | 1/2009 | Schipka | 726/22 |
| 2010/0031354 A1* | 2/2010 | Hudis et al. | 726/22 |

OTHER PUBLICATIONS

Berger, M.S., et al., Fast pattern matching in compressed data packages; GLOBECOM Workshops (GC Wkshps), 2010 IEEE (978-1-4244-8863-6); 2010. p. 1591-1595.*
Akiyama, M., et al;Blacklisting Improvement: Inspecting Structural Neighborhood of Malicious URLs; IT Professional (1520-9202) 2012. Iss.99;p. 1-1.*
Black-Box Automated Detection of Malicious Content in Web Applications; Jan. 28, 2010. Source: IP.com.*

* cited by examiner

*Primary Examiner* — Luu Pham
*Assistant Examiner* — Angela Holmes
(74) *Attorney, Agent, or Firm* — Beyer Law Group LLP (57) ABSTRACT

Providing malware-free web content to a user is disclosed. The web content is any type of web content that may potentially be infected by any type of malware. Upon receiving a request for a piece of web content from the user, the requested piece of web content is obtained from the appropriate source, and a dynamic template for the piece of web content is retrieved. The dynamic template indicates whether the requested piece of web content includes any malware and what actions are to be performed if any malware is included in the piece of web content. The requested piece of web content is cleaned up by performing the actions indicated in the dynamic template. Thereafter, the piece of web content is provided to the user. The dynamic template is updated from time to time based on the currently available information regarding the piece of web content.

19 Claims, 7 Drawing Sheets

PROVIDING MALWARE-FREE WEB CONTENT TO END USERS USING DYNAMIC TEMPLATES

FIELD OF THE INVENTION

The present invention generally relates to providing malware-free web content to end users. More specifically, the present invention relates to cleaning up malware hidden in web content using dynamic templates before providing web content to end users.

BACKGROUND OF THE INVENTION

Figure 1:
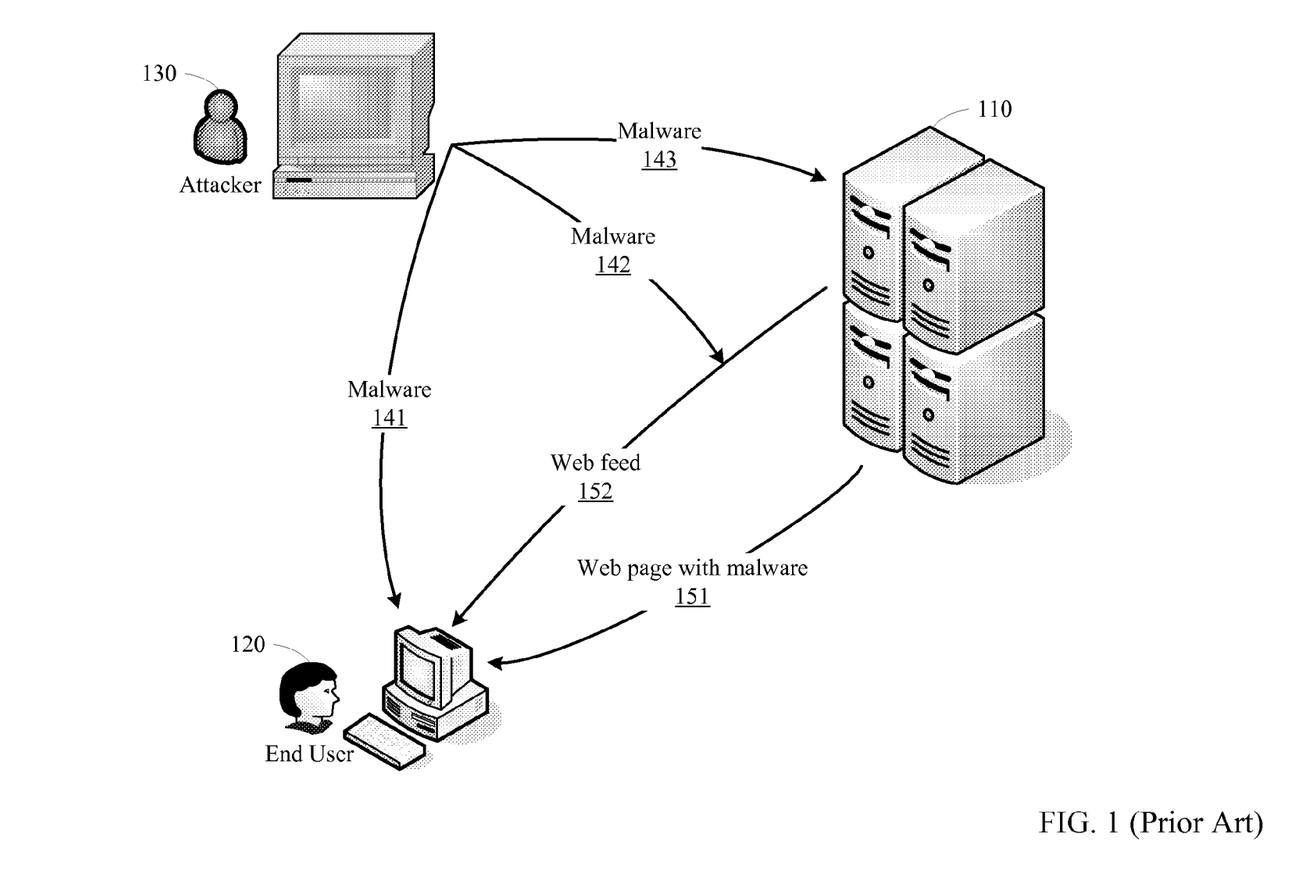
FIG. 1 (prior art) illustrates a few simple scenarios of how attackers may send malware to end users.

Malware, or malicious software, attacks take many different forms and target many different types of web content. Computer viruses, worms, trojan horses, spyware, rootkit, adware, spam, phishing . . . are but a few types of malware. FIG. 1 (prior art) illustrates a few simple scenarios of how attackers may send malware to end users. Depending on the actual type of web content provided to the end users, the attackers may target different stages or aspects of the process of transferring web content to the end users.

For example, sometimes, malware is sent to potential victims disguised as legitimate communications, such as attachments to email messages. The attacker 130 may send an email, a SMS (short message service), or an IM (instant messaging) to the end user 120 directly with a piece of malware 141 hidden in the message. Sometimes, malware is embedded in web page source code and sent to potential victims when the victims request these infected web pages. The attacker 130 may send a piece of malware 143 to the web server 110, and the malware 143 embeds itself in the web page source code or modifies the web page source code to perform some unauthorized actions. When the end user 120 requests the infected web page, the piece of malware 143 is sent to the end user 120 along with the requested web page 151. Sometimes, malware is injected into web feeds, such as Atom or RSS feeds, and sent to potential victims along with feed content. The attacker 130 may inject a piece of malware 142 directly into the web feed 152 sent from the web server 110 to the end user 120.

Many types of anti-malware methods and products have been developed to combat malware attacks. Some detect malware based on known malware patterns. Some block suspicious types of web content, such as executable files or popup windows. Some rank web content based on their safety levels. However, most anti-malware solutions focus on detecting various forms of malware rather than removing malware from infected web content.

SUMMARY OF THE INVENTION

Broadly speaking, the present invention generally relates to providing malware-free web content to end users. More specifically, the present invention relates to cleaning up malware hidden in web content using dynamic templates before providing web content to end users.

According to various embodiments, systems and methods for providing malware-free web content to a user are provided. The web content is any type of web content, such as web pages, web feeds, messages, etc., that may be infected by malware. Each piece of web content is identified by a unique identifier, such as a URL (uniform resource locator) or URI (uniform resource identifier).

According to one embodiment, when a user requests a piece of web content, a web content proxy obtains the requested piece of web content from the appropriate source(s). The piece of web content may potentially be infected with malware. The web content proxy forwards the URL or URI for the requested piece of web content to a dynamic template provider.

The dynamic template provider determines whether a dynamic template associated with the requested piece of web content already exists in a template database. If so, the dynamic template provider retrieves the dynamic template associated with the requested piece of web content from the template database and forwards the template to the web content proxy. The dynamic template indicates whether the corresponding piece of web content includes any malware and what action(s) is/are to be performed if any malware is included in the piece of web content.

On the other hand, if no dynamic template associated with the requested piece of web content currently exists in the template database, a web content analyzer retrieves and analyzes the requested piece of web content, creates a dynamic template for the requested piece of web content, and stores the dynamic template in the template database. Thereafter, the dynamic template provider forwards the dynamic template associated with the requested piece of web content to the web content proxy.

The web content proxy cleans up the requested piece of web content using the dynamic template received from the dynamic template provider by performing the action(s) indicated in the dynamic template with respect to each piece of malware included in the piece of web content. Thereafter, the web content proxy provides the cleaned-up piece of web content to the user.

According to one embodiment, a dynamic template associated with a piece of web content includes a unique identifier for the piece of web content, and for each piece of malware included in the piece of web content, a location of the piece of malware in the piece of web content, a type of the piece of malware, a rating of the piece of malware, and at least one action to be performed with respect to the piece of malware when cleaning up the piece of web content.

According to one embodiment, from time to time, the web content analyzer retrieves updated information on the pieces of web content and updates their respective dynamic templates stored in the template database according to the updated information. In addition, the web content analyzer retrieves and analyzes new pieces of web content, constructs templates for these new pieces of web content, and stores the templates in the template database.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Malware attacks may take many different forms and target many different aspects of the web content. Often, attackers hide malware in various types of web content, such as web pages, web feeds, messages, etc., so that the malware is sent to users along with the web content. To combat such malware attacks, systems and methods for detecting as well as removing malware from the infected web content are provided, so that the web content may be provided to the users free of malware. The web content may be any type of web content, e.g., web pages, web feeds, messages, attachments, etc., that may be infected by malware.

According to one embodiment, when a user requests a piece of web content, identified by a unique URL or URI, a web content proxy obtains the requested piece of web content from the appropriate source(s). The web content is any type of web content, such as web pages, web feeds, messages, etc., that may potentially be infected by malware. The web content proxy forwards the URL or URI for the requested piece of web content to a dynamic template provider.

The dynamic template provider retrieves a dynamic template associated with the requested piece of web content from a dynamic template database and forwards the template to the web content proxy. The dynamic template indicates whether the corresponding piece of web content includes any malware and what action(s) is/are to be performed if any malware is included in the piece of web content.

The web content proxy cleans up the requested piece of web content using the dynamic template received from the dynamic template provider by performing the action(s) indicated in the dynamic template with respect to each piece of malware included in the piece of web content. Thereafter, the web content proxy provides the cleaned-up piece of web content to the user.

Figure 2:
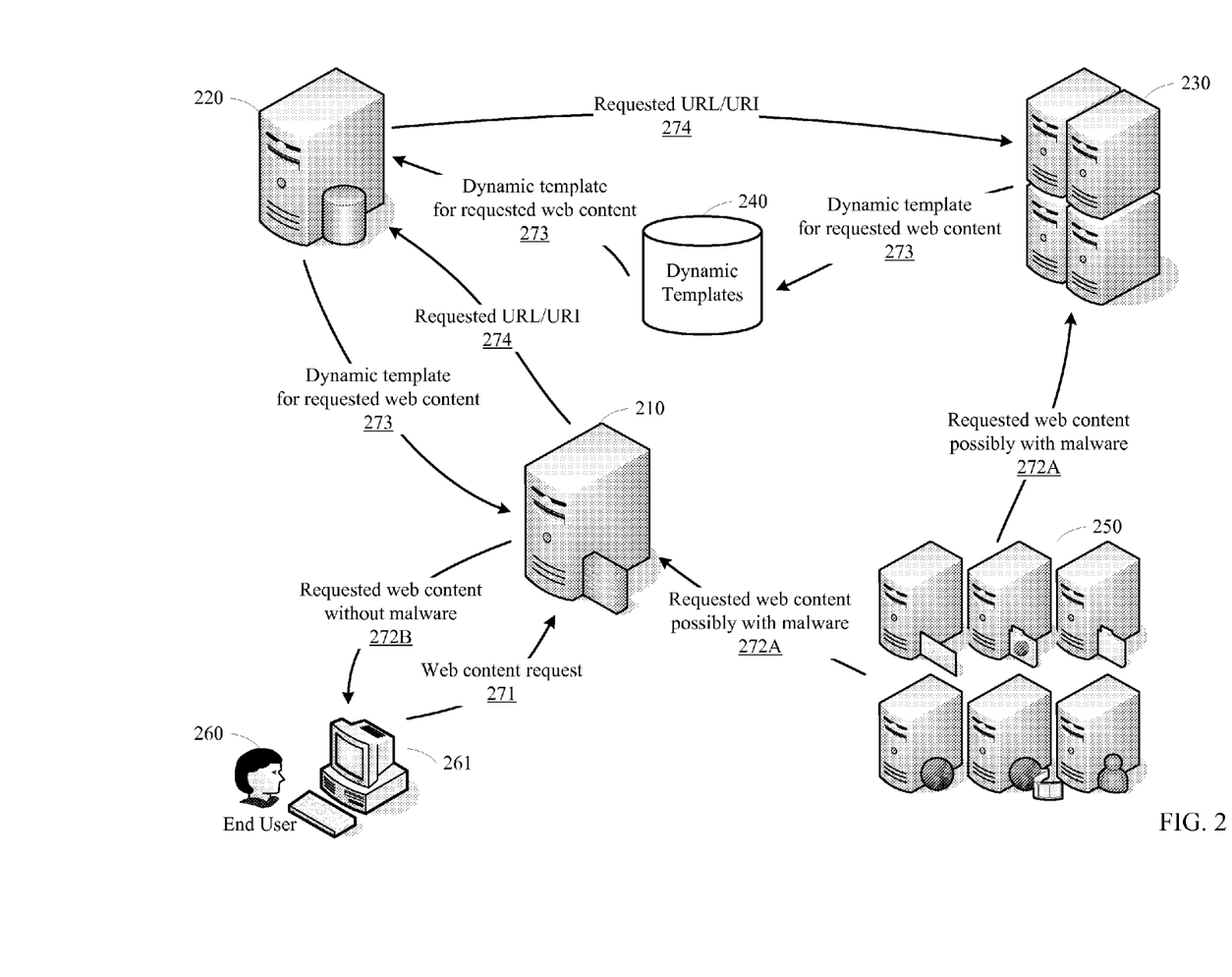
FIG. 2 illustrates a system for cleaning up malware included in web content before providing the web content to a user according to one embodiment.
Figure 3:
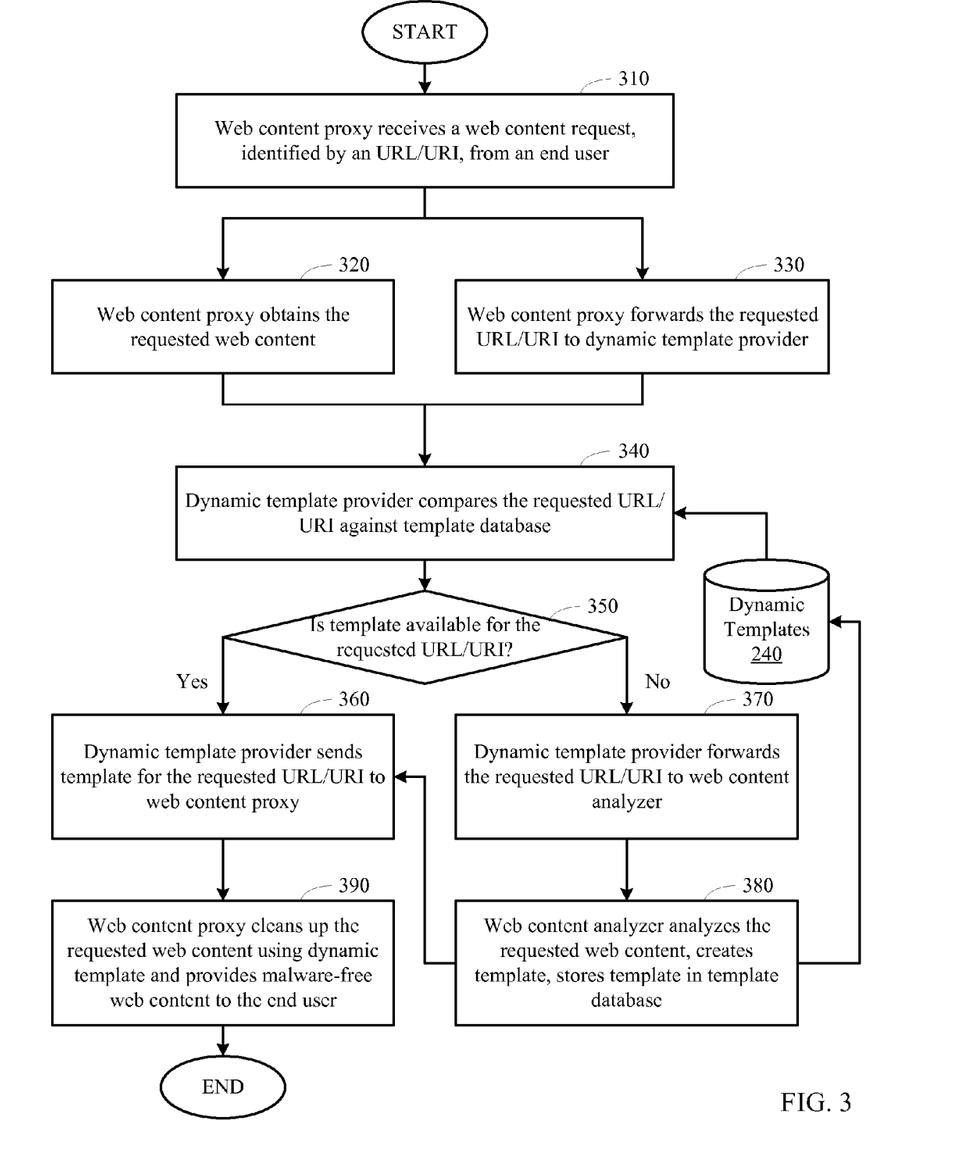
FIG. 3 illustrates a method for cleaning up malware included in web content before providing the web content to a user according to one embodiment.

FIG. 2 illustrates a system for cleaning up malware included in web content before providing the web content to a user according to one embodiment. FIG. 3 illustrates a method for cleaning up malware included in web content before providing the web content to a user according to one embodiment. The components shown in FIG. 2 are described in connection with the steps shown in FIG. 3.

According to the embodiment shown in FIGS. 2 and 3, when an end user 260 requests a particular piece of web content, the web content request 271 is first sent, i.e., redirected, to a web content proxy 210. The web content proxy 210 may be located at various places. For example, in some cases, a web content proxy 210 may be located on each client device 261 associated with the user 260. In this case, it is possible that each web content proxy 210 may be customized specifically for the individual user 260 associated with the client device 261 where the web content proxy 210 resides in terms of what types of content are considered unwanted content for the individual user 260. All requests 271 sent from the client device 261 are processed by the web content proxy 210 first. In other cases, one web content proxy 210 may server multiple client devices 261. In this case, the web content proxy 210 may reside on a server or a router communicatively connected with the client devices 261. Requests 271 sent from the client devices 261 are first redirected to the web content proxy 210 over the Internet or the Intranet. The redirection of the requests 271 may be achieved either by software or hardware, such as modifying the request headers.

The requested piece of web content is identified by its unique URL or URI, and the client device 261 associated with the user 260 sends the unique identifying URL/URI as a part of the web content request 271 to the web content proxy 210.

The web content proxy 210, upon receiving the web content request 271 from the client device 261 associated with the user 260 (step 310), performs several operations. First, the web content proxy 210 obtains the requested piece of web content 272A from the appropriate source 250 (step 320), general via the Internet and sometimes via the Intranet. As indicated above, the requested piece of web content 272A may be any type of web content that may be infected with malware. Thus, depending on the specific type of the requested piece of web content 272A, the source 250 from which the web content proxy 210 obtains the requested piece of web content 272A may vary. For example, if the requested piece of web content 272A is an email message, the web content proxy 210 may obtain the requested piece of web content 272A from an email server. If the requested piece of web content 272A is a web page, the web content proxy 210 may obtain the requested piece of web content 272A from a web server. If the requested piece of web content 272A is a web live feed, the web content proxy 210 may obtain the requested piece of web content 272A from a real-time communication server that functions as an aggregator. If the requested piece of web content 272A is a file, the web content proxy 210 may obtain the requested piece of web content 272A from a file or FTP (file transfer protocol) server, and so on. It is possible that the requested piece of web content 272A obtained from the source 250 on the Internet may be infected with some type of malware.

Second, the web content proxy 210 forwards the URL/URI 274 identifying the requested piece of web content 272A to a dynamic template provider 220 to obtain the dynamic template associated with the requested piece of web content 272 A (step 330).

A dynamic template database 240 is communicatively linked with the dynamic template provider 220, which is used to store existing dynamic templates for various pieces of web content. Each dynamic template is identified by the unique URL/URI for the piece of web content with which the dynamic template is associated. A dynamic template indicates whether the corresponding piece of web content with which it is associated contains any malware, and if so, the action(s) to be taken with respect to each piece of malware contained in the piece of web content.

According to one embodiment, each dynamic template includes the URL/URI for the piece of web content with which it is associated, and for each piece of malware contained in the corresponding piece of web content, the location, type, and rating of the piece of malware, and the action(s) to be taken with respect to that piece of malware. The actual content of the dynamic templates often varies depending on the types of web content, i.e., web page, web feed, email, etc., with which the templates are associated.

The following table 1 shows one example of a dynamic template, where the corresponding piece of web content contains one piece of malware. In this example, each piece of information is represented by an attribute name and an attribute value.

TABLE 1

A Sample Dynamic Template Associated with
a Piece of Web Content that Contains One Piece of Malware

| Web Content Identifier | http://googletesting.blogspot.com/atom.xml |
|---|---|
| Malware #1 | |
| Location | /channel/title |
| Type | spam |
| Rating | 3 |
| Action(s) | add a stamp |

The sample dynamic template shown in Table 1 is associated with a piece of web content, specifically an atom feed, having the URL "http://googletesting.blogspot.com/atom.xml". This piece of web content contains one piece of malware, Malware #1. The location of Malware #1 is at the node "/channel/title" within the XPATH (XML Path Language) string. Depending on the type of web content, different types of indicators may be used to mark the locations of the individual pieces of malware. For example, if the piece of web content is a web page, i.e., HTML (HyperText Markup Language) or XML (Extensible Markup Language) file, a location indicator may be a DOM (Document Object Model) attribute or an element identifier. If the piece of web content is a binary file, a location indicator may be a byte count.

The type of Malware #1 is "spam". Again, different embodiments may define different types of malware. Thus, the term "malware" may refer to traditional types of malicious software, such as viruses, worms, spyware, etc., as well as any type of unwanted or annoying content embedded in the piece of web content, such as spam, advertisement, pornography, etc. Common types of malware include virus, worm, trojan horse, spyware, rootkit, adware, spam, phishing, pornography, advertisement, and pop-up window. Moreover, individual users may be able to define and customize their own lists of malware types so that each user is able to remove or modify those specific types of malware explicitly chosen by the user.

The rating of Malware #1 is "3". The rating is a scale number that indicates the severity of the piece of malware. Any scale system may be used for the rating attribute. For example, on a numerical scale ranging from 1 to 10, 1 may represent the least severe level and 10 may mean the most severe level. Often, the rating of a piece of malware is determined based at least in part on how much damage the piece of malware may cause. Thus, a virus often has a higher rating than a spam, which may have a higher rating than an advertisement. The action(s) to be taken with respect to a piece of malware may also depend on the rating of the piece of malware. For example, a piece of malware with a relatively lower rating may be allowed to remain in the piece of web content while a piece of malware with a relatively higher rating should be removed.

The action to be taken with respect to Malware #1 is to "add a stamp", which means adding a tag to this piece of malware. Different types of malware may require different action(s). Some types of malware, such as those that do not cause much damage, i.e., with relatively lower ratings, may be tagged or flagged but allowed to remain in the piece of web content. Some types of malware may be replaced with alternative predefined content. Some types of malware may be modified, i.e., having the malicious portion cleaned up. Some types of malware may be deleted completely. Some types of malware, such as pop-up windows, may be blocked. Similar to malware types, individual users may be able to define and customize what action(s) is/are to be taken with respect to each type of malware. For example, one user may wish to remove all advertisements, while another user may allow certain types of advertisements to remain in the web content. One user may wish to remove all pornographic content, while another user may wish to receive such content.

The following table 2 shows another example of a dynamic template, where the corresponding piece of web content contains two pieces of malware. In this example, the piece of web content is a web page.

TABLE 2

A Sample Dynamic Template Associated with
a Piece of Web Content that Contains Two Pieces of Malware

| Web Content Identifier | http://freeware.com/track.asp?src= industry&dst=enterprise_software |
|---|---|
| Malware #1 | |
| Location | element id=31758 |
| Type | advertisement |
| Rating | 2 |
| Action(s) | add a stamp |
| Malware #2 | |
| Location | element id=68167 |
| Type | pop-up window |
| Rating | 4 |
| Action(s) | block |

Email is another type of web content that may be used to deliver viruses. The following is a sample email that contains a virus.

From: "MailZhen" <MailZhen@QATESTDOM1>
Subject: (SF-V019)Cleanable Virus
Date: Wed, 11 May 2005 09:57:03 +0800
MIME-Version: 1.0
Content-Type: multipart/mixed;
   boundary="----=_NextPart_000_0004_01C5560F.C893E140"
X-Priority: 3
X-MSMail-Priority: Normal
X-Unsent: 1
X-MimeOLE: Produced By Microsoft MimeOLE
V6.00.2600.0000
This is a multi-part message in MIME format.
------=_NextPart_000_0004_01C5560F.C893E140
Content-Type: multipart/alternative;
   boundary="----=_NextPart_001_0005_01C5560F.C893E140"
------=_NextPart_001_0005_01C5560F.C893E140

Content-Type: text/plain;
charset="iso-8859-1"
Content-Transfer-Encoding: base64
VGhpcyBtYWlsIGluY2x1ZGUgQ2xlYW5hYmlIHZpcn
VzLg0K
------=_NextPart_001_0005_01C5560F.C893E140
Content-Type: text/html;
charset="iso-8859-1"
Content-Transfer-Encoding: base64
PCFET0NUWVBFIEhUTUwgUFVCTElDICItLy9XM
0MvL0RURCBIVE1MIDQ
uMCBUcmFuc210aW9uYWwv
L0VOIj4NCjxIVE1MPjxIRUFEPg0KPE1FVEEgaHR0c
C1lcXVpdj1Db25 0ZW50LVR5cGUgY29udGVu
dD0idGV4dC9odG1sOyBjaGFyc2V0PWlzby04ODU5L
TEiPg0KPE1FVEE gY29udGVudD0iTVNIVE1M
IDYuMDAuMjYwMC4wIiBuYW1lPUdFTkVSQVRPUj
4NCjxTVFlMRT48L1N
UWUxFPg0KPC9IRUFEPg0K
PEJPRFkgYmdDb2xvcj0jZmZmZmZmPg0
KPERJVj48Rk9OVCBmYWNlPUF
yaWFsIHNpemU9Mj5UaGlz
IG1haWwgaW5jbHVkZSZuYnNwO0NsZWFuYWJsZS
ANCnZpcnVzLjwvRk9OVD48L0RJVj48LOJPRFk+
PC9IVE1MPg0K
------=NextPart_001_0005_01C5560F.C893E140--
------=_NextPart_000_0004_01C5560F.C893E140
Content-Type: application/x-msdownload;
name="TEST_VIR.EXE"
Content-Transfer-Encoding: base64
Content-Disposition: attachment;
filename="TEST_VIR.EXE"
TVqVAAYAAAAgAEEA//+KAAAEakwxAAAAH-
gAAAAEAAAAAAAAAAAAAAAA
AAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAABU
cmVuZCB0ZXN0IHZpcnVzLMzwLg0Ert4VgPDM8C4
NBK7eFYDwzPAuDQS
u3hWA8MzwLg0Ert4VgPDM8C4NBK7eFYDwzPAD
o0GIwBQywAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
AAAAAAAAAAAAAAAAAAAAAAAAAAAAAAAA
AAAAAAAAAAAAAAAAAAAAAAA
AAAAAAAAAAAAAAAAAAAAA
------=NextPart_000_0004_01C5560F.C893E140-

The virus hidden in the above email message may be discovered by parsing and analyzing the content of the email message. Consequently, a dynamic template may be constructed to remove the virus from the email message based on the results of the analysis. The following table 3 shows a sample dynamic template that may be used to clean up the above email message.

TABLE 3

A Sample Dynamic Template Associated with an Email Message that Contains a Virus

| | |
|---|---|
| Web Content Identifier | uuid:705738e3907891e3 |
| Malware #1 | |
| Location | offset: 0x20E, length: 0x320 |
| Type | virus |
| Rating | 8 |
| Action(s) | clean |

Since the dynamic template shown in Table 3 is associated with an email message, and email messages generally do not have URLs/URIs, an UUID (Universal Unique Identifier) may be use as the web content identifier to identify the particular email message. The location of the virus is specified by an offset from the beginning of the email and a length, both expressed in number of bytes. The type of the malware is "virus", and the rating is "8". Since a virus generally causes more harm to a computer system, it is given a higher rating than, for example, advertisement, spam, or pop-up window. The action to be taken is "clean", which indicates that the virus should be removed from the email message, i.e., cleaning up the email message.

Upon receiving the URL/URI 274 sent by the web content proxy 210, the dynamic template provider 220 searches through the template database 240 for a dynamic template that corresponds to the requested URL/URI 274 (step 340). This may be achieved by comparing the requested URL/URI 274 against the web content identifier contained in each of the dynamic templates stored in the template database 240.

If a match is found (step 350), i.e., a dynamic template already exists in the template database 240 that corresponds to the requested web content 272A, then the dynamic template provider 220 sends the matched dynamic template 273 to the web content proxy 210 (step 360).

If no match is found (step 350), i.e., no dynamic template currently exists in the template database 240 that corresponds to the requested web content 272A, then the dynamic template provider 220 forwards the requested URL/URI 247 to a web content analyzer 230 so that a dynamic template may be constructed for the requested web content 272A (step 370).

The web content analyzer 230 obtains the requested piece of web content 272A using the unique URL/URI from the appropriate source 250 and analyzes its content to construct a dynamic template for the requested piece of web content 272A and stores the dynamic template in the template database 240 (step 380). FIG. 4 illustrates a method for constructing a dynamic template for a piece of web content according to one embodiment.

The web content analyzer parses the piece of web content to detect individual pieces of malware hidden in the web content (step 410). Different methods or a combination of different methods may be employed to detect malware hidden in the requested web content 272A. For example, if the requested piece of web content is a web page, its source code in HTML or XML may be parsed with the help of the DOM structure. Other syntaxes, such as XPath or XPointer, may be employed as well. Malware such as viruses may be detected using known patterns. Certain keywords may also be used to detect certain types of content by conducting keyword searches. For example, words such as "sale" or specific brand or product names may be connected with adverting content and words such as "sex" may be connected with pornographic content. Various rules may also be predefined to indicate how malware should be detected. For example, rules may be defined to describe unique characteristics associated with various types of malware.

Figure 4:
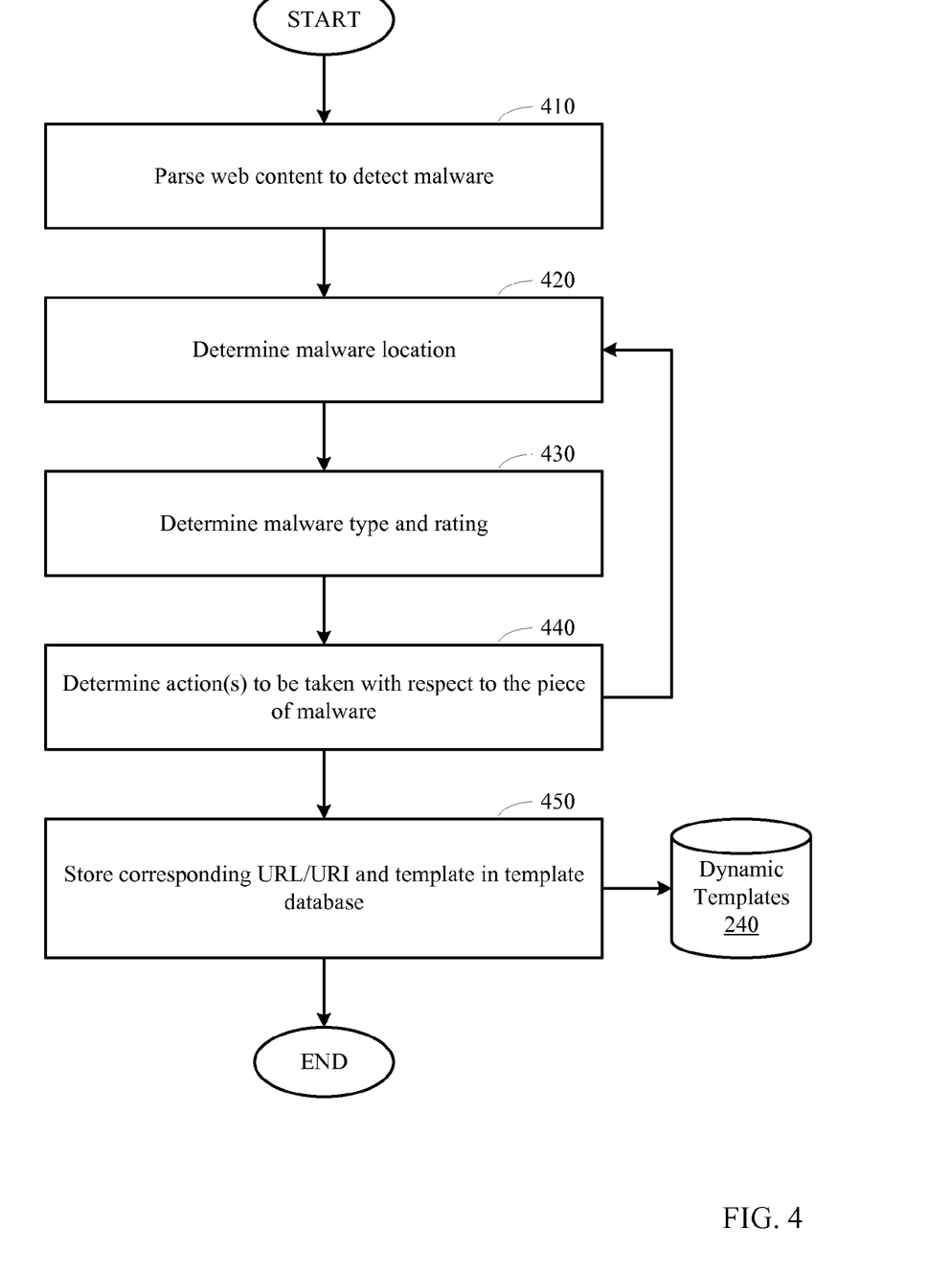
FIG. 4 illustrates a method for constructing a dynamic template for a piece of web content according to one embodiment.

Once a particular piece of malware is identified in the requested web content 272A, its location is identified using a suitable location indicator (step 420). In addition, the piece of malware is categorized and rated based on their respected types and a predefined set of rules (step 430). For example, the rules may indicate which type of malware receives what level of rating. Similarly, the action(s) to be taken for each piece of malware may also be determined based on predefine rules and/or their severity rating levels (step 440). For example, one rule may specify that all types of malware having ratings above a certain predefined threshold are to be removed. Another rule may specify that a particular type of malware is to be replaced with some alternative content, and so on. Steps 420, 430, and 440 are repeated each time a piece of malware is detected in the web content being analyzed.

Once a dynamic template for the requested piece of web content 272A is constructed, it is stored in the template database 240 (step 450). The dynamic template provider 220 forwards the dynamic template 273 to the web content proxy 210 (step 360).

Upon receiving the dynamic template 273, the web content proxy 210 cleans up the requested piece of web content 272A by performing the action(s) indicated in the dynamic template 273 with respect to each piece of malware found in the requested web content 272A (step 390). For example, if the dynamic template specifies that a particular piece of malware is to be deleted, then the web content proxy 210 deletes the specified piece of malware from the requested web content 272A. Of course, if the requested web content 272A does not contain any malware, then no action is needed. In this case, the dynamic template 273 associated with this particular piece of web content 272A may explicitly indicate that no malware has been found in the piece of web content 272A. Thereafter, the web content proxy 210 provides the cleaned-up web content 272B to the user 260 who made the request initially (step 390).

It is possible that the web content analyzer 230 may not be able to construct a dynamic template for a particular piece of web content (step 380). In this case, according to one embodiment, the dynamic template provider 220 may be instructed to only wait for a predefined period of time. And if no dynamic template is constructed for the particular piece of requested web content, then the dynamic template provider 220 sends a signal to the web content proxy 210, indicating that no dynamic template for the piece of requested web content is available. The web content proxy 210 then provides the requested web content to the user 260 without any preprocessing. Optionally, a warning message may be sent to the user 260, notifying the user 260 that the requested web content has not been cleaned. This avoids having the user 260 waiting too long for any particular piece of requested web content.

In FIG. 2, the web content proxy 210, the dynamic template provider 220, and the web content analyzer are shown as separate components. There are some advantages in separating the web content proxy 210 and the dynamic template provider 220 into two separate components. For example, by decoupling or separating the functionalities of the web content proxy 210 and the dynamic template provider 220, each component only handles a smaller set of functionalities, thus lessen the workload placed on each component. One dynamic template provider 220 may server multiple web content proxies 210. Each component may enjoy greater flexibility, and consequently, customization may be done on different levels. For example, each web content proxy 210 may be customized with respect to one user 260.

However, according to various alternative embodiments, the functionalities of these components may be organized differently. For example, the web content proxy and the dynamic template provider may be combined into a single component, such that the combined component retrieves the appropriate dynamic template from the template database 240. Alternatively, the dynamic template provider and the web content analyzer may be combined into a single component, such that the combined component is responsible for both managing the template database 240 and analyzing web content to construct and/or update the dynamic templates.

In addition, each of these components may reside either on a server or on a client device. For example, the web content proxy 210 may reside on a server, such that requests from the user 260 are first sent to the web content proxy 210. Alternatively, if the client device associated with each user 260 has sufficient resources, such as processing power, then the web content proxy 210 may reside locally on the client device associated with each user 260. Thus, the components shown in FIG. 2 and their respective functionalities may vary in alternative embodiments, such that the various components may be combined and/or the functionalities of the components may be distributed differently among the components. The various components are communicatively connected to each other, so that they may communicate with each other via the Internet and the Intranet.

Similarly, some of the steps shown in FIG. 3 may be performed in different orders according to various embodiments. For example, step 320 may be performed any time after step 310 and before step 380 and may be performed in parallel with steps 330, 340, 350, 360, or 370.

The templates associated with the web content are dynamic because they may be updated from time to time, as new information on the individual pieces of web content become available. The web content analyzer 230 may crawl through the Internet to collect web content on its own, independent of any specific user request. For each piece of web content found on the Internet, the web content analyzer 230 constructs a dynamic template for it, e.g., according to the steps shown in FIG. 4, and stores the dynamic template in the template database 240. Consequently, when a user requests a particular piece of web content, it is likely the dynamic template associated with that piece of web content already exists in the template database 240 and is readily available.

Sometimes, the content of individual pieces of web content may change from time to time. Again, the web content analyzer 230 may crawl through the Internet to collect updated web content, whose corresponding dynamic templates already exist in the template database 240. The web content analyzer 230 may reanalyze the updated web content to update their corresponding dynamic templates. For example, if a new piece of malware is detected in a piece of web content, its information, i.e., location, type, rating, action(s), is added to the corresponding template. Conversely, if a piece of malware is no longer detected, its information is removed from the corresponding template.

According to one embodiment, in addition to the attributes shown in Tables 1 and 2, each dynamic template also includes a timestamp that indicates the time that the template was last modified. The web content analyzer 230 may use this information to determine whether a piece of web content needs to be reanalyzed. For example, if the template has a timestamp that is older than the timestamp of the corresponding piece of web content, then the corresponding piece of web content needs to be reanalyzed since it has been modified after its template was last modified. The dynamic template provider 220 and the web content proxy 210 may determine whether a template found in the template database 240 is too old.

Figure 5:
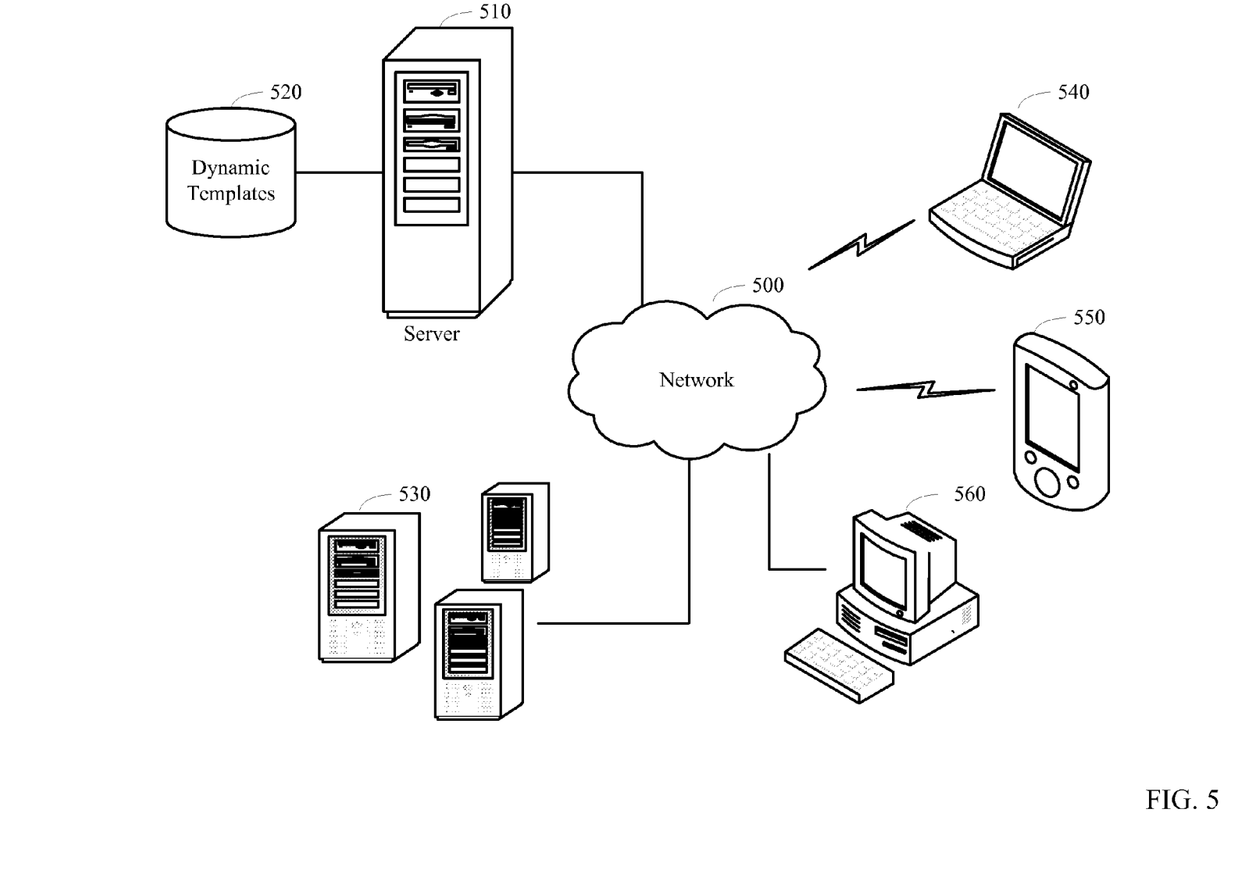
FIG. 5 is a simplified diagram of a network environment in which specific embodiments of the present invention may be implemented.

FIG. 5 is a simplified diagram of a network environment in which specific embodiments of the present invention may be implemented. The various aspects of the invention may be practiced in a wide variety of network environments (represented by network 500) including, for example, TCP/IP-based networks, telecommunications networks, wireless networks, etc. The servers and the clients may communicate with each other through the Network 500, and they may access the Network 500 either via wired connections or wireless connections. One or more databases, e.g., database 520, may be communicatively linked to the server 510 for storing dynamic templates individual pieces of web content.

The steps shown in FIGS. 3 and 4 may be implemented as computer program products having computer instructions stored in computer readable media and executed on various servers, such as web application servers 530 or back-end server 510, or client devices, such as desktop computer 560, notebook computer 540, handheld computer 550, etc. The actual implementation of the system may vary. The computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

Figure 6A:
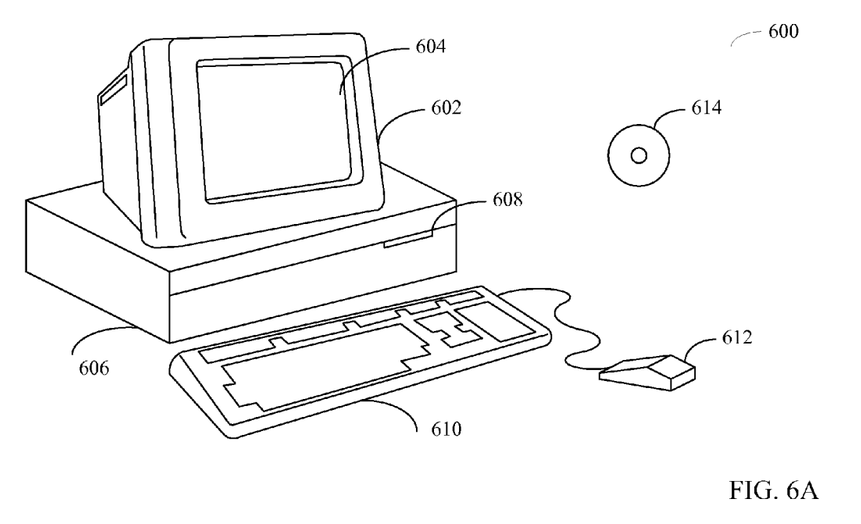
FIGS. 6A and 6B illustrate a computer system suitable for implementing embodiments of the present invention.
Figure 6B:
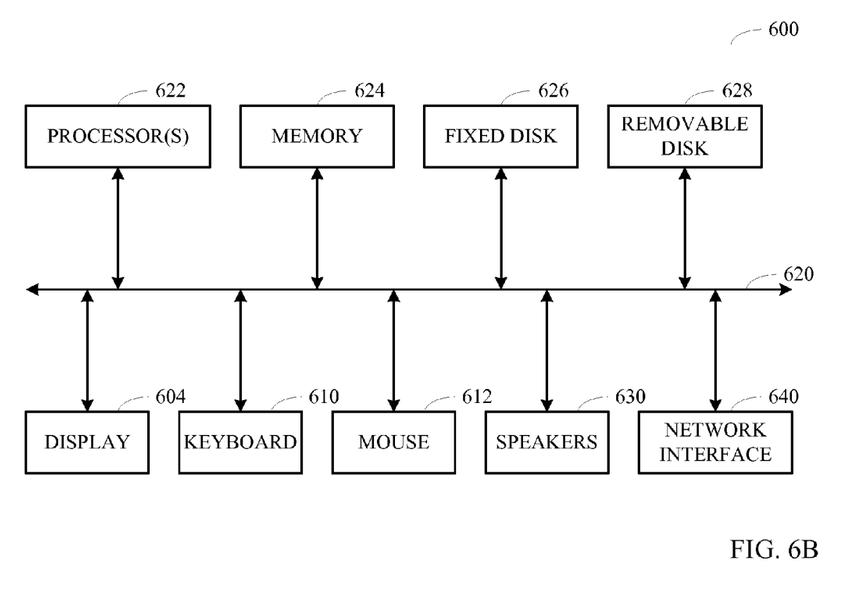

FIGS. 6A and 6B illustrate a computer system 600 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computer system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 628 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Removing Malware from Web Feeds

Figure 7:
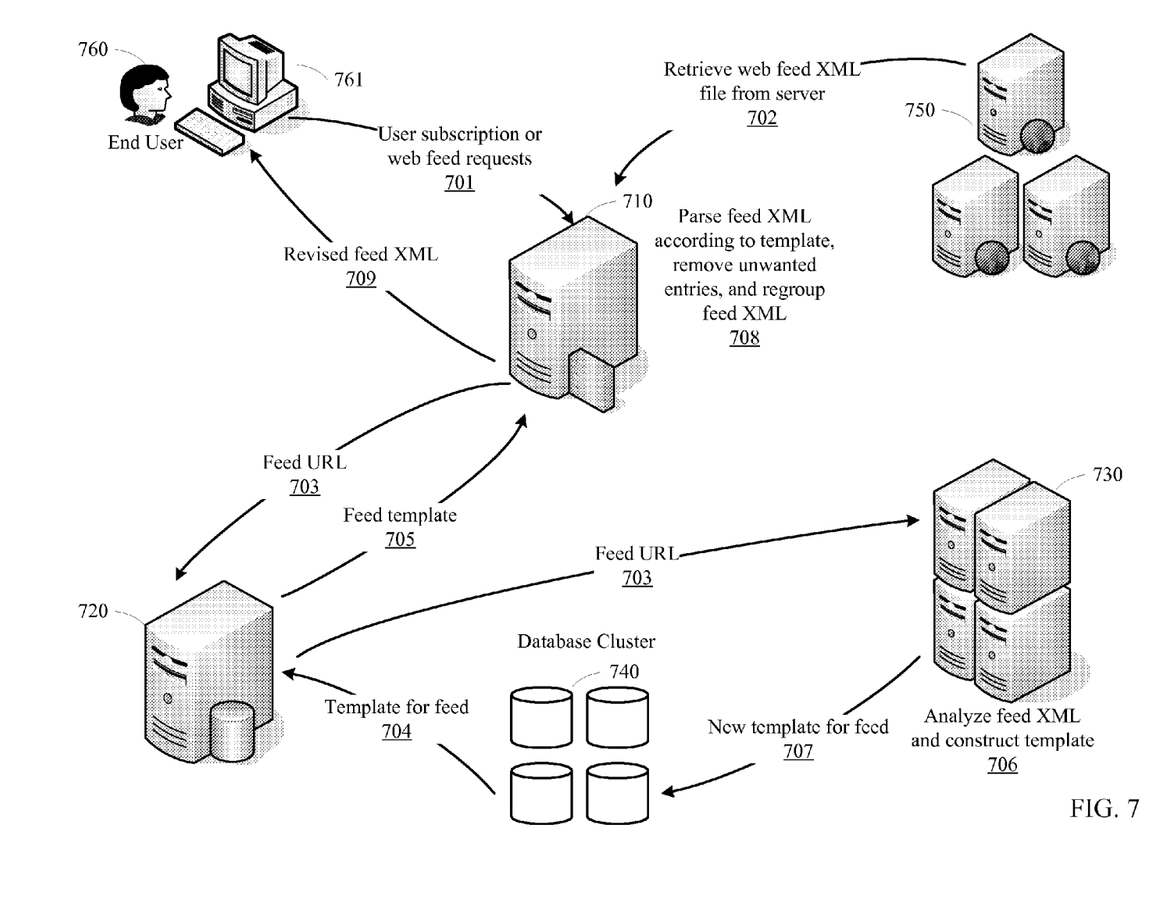
FIG. 7 illustrates a system for cleaning up malware embedded in web feeds before providing the web feeds to a user according to one embodiment.

FIG. 7 illustrates a system for cleaning up malware embedded in web feeds before providing the web feeds to a user according to one embodiment. This may be considered a specific example of the system shown in FIG. 2, where the user request web feeds that comply with RSS and/or Atom standards.

The user 760 sends a subscription or a web feed request 701 via the associated client device 761 to the feed proxy 710. The feed request 701 is identified by a unique URL. If the feed proxy 710 resides on the client device 761, then the feed proxy 710 may intercept the request 701 directly. If the feed proxy 710 resides elsewhere, the request 701 may be redirected to the feed proxy 710 over the Internet or the Intranet.

Upon receiving the web feed request 701, the feed proxy 710 obtains the requested web feed in the form of XML file 702 from the RSS server 750 over the Internet. The feed proxy 710 also forwards the URL for the requested feed 703 to the dynamic template provider 720.

The dynamic template provider queries the database cluster 740 for records, i.e., templates, associated with the requested feed 703. On the one hand, if one or more template(s) is/are found in the database cluster 740 for the requested web feed 703, then the most current template 704 is retrieved from the database cluster 740 and forwarded to the feed proxy 710. The following Table 4 illustrates a sample template for a web feed that has multiple suspicious entries. In this example, the location of each suspicious entry is identified by its corresponding XML entry.

TABLE 4

A Sample
Template for a Web Feed

| Entry 1 category | ... |
| Entry 1 security score | ... |
| ... | ... |
| Entry 2 category | ... |
| Entry 2 security score | ... |
| ... | ... |
| Entry 3 category | ... |
| Entry 3 security score | ... |
| ... | |

On the other hand, if no template is found in the database cluster 740 for the requested web feed 703, then the dynamic template provider forwards the URL for the requested feed 703 to a feed analyzer 730 so that a new template may be constructed for the requested feed. The feed analyzer 730 obtains the XML file of the requested feed from the feed server 750, parses the XML file using various methods, such as using XPATH to identify the locations of the suspicious entries, and constructs a new template for the requested feed 706. The new template 707 is then stored in the database cluster 740. Thereafter, the dynamic template provider forwards the template 707 to the fee proxy 710.

According to some embodiments, when parsing an XML file that represents a web feed, XPath, which is a language for finding information in an XML document, is used to navigate through elements and attributes in the XML document. The XML file is first parsed into a DOM tree and the feed analyzer 730 then traverses all the elements contained in the XML file to scan the feed content for potential malware. The following is a sample XML code, which represents a RSS feed, that contains two pieces of malware.

```
<?xml version="1.0" encoding="ISO-8859-1"?>
<rss version="2.0">
<channel>
<title> <script>alert('Channel Title')</script> </title>
<link>http://www.mycoolsite.com/</link>
<description> <script>alert('Channel Description')</script>
</description>
<language>en-us</language>
<copyright>Mr Cool 2006</copyright>
<pubDate>Thu, 22 Jun 2006 11:09:23 EDT</pubDate>
<ttl>10</ttl>
<image>
<title> <script>alert('Channel Image Title')</script>
</title>
<link>http://www.mycoolsite.com/</link>
<url>http://www.mycoolsite.com/logo.gif</url>
<width>144</width>
<height>33</height>
<description><script>alert('Channel Image Description')
</script>
</description>
</image>
</channel>
</rss>
```

In the above sample, the two pieces of malware are located at "<title>< script> alert ('Channel Title')</script> </title>" and "<title> <script>alert ('Channel Image Title')</script> </title>" respectively. Once the feed analyzer 730 locates these two pieces of malware, the XPATH expressions representing the two elements are used to identify the locations of the malicious elements. In this particular case, the XPATH for the first malicious element is "/rss/channel/title[0]", and for the second malicious element is "/rss/channel/title[1]".

A dynamic template is constructed for each web feed based on the results of parsing the XML code representing the web feed. The following is another sample XML code that represents a web feed.

```
<?xml version="1.0"?>
<rss version="2.0">
<channel>
<title>Liftoff News</title>
<link>http://liftoff.msfc.nasa.gov/</link>
<description>Liftoff to Space Exploration.</description>
<language>en-us</language>
<pubDate>Tue, 10 Jun 2003 04:00:00 GMT</pubDate>
<lastBuildDate> Tue, 10 Jun 2003 09:41:01 GMT</lastBuildDate>
<docs>http://blogs.law.harward.edu/tech/rss</docs>
<generator>Weblog Editor 2.0</generator>
<managingEditor>editor@example.com</managingEditor>
<webmaster>webmaster@example.com</webmaster>
<item>
<title>Star City</title>
<link>http://liftoff.msfc.nasa.gov/news/2003/news-starcity.asp</link>
<description>How do Americans get ready to work with Russians aboard the International Space Station.</description>
<pubDate>Tue, 03 Jun 2003 09:39:21 GMT</pubDate>
<guid>http://liftoff.msfc.nasa.gov/2003/06/03.html#item573</guid>
</item>
<item>
<description>Sky watchers in Europe, Asia, and parts of Alaska and Canada will experience <href="http://science.nasa.gov/headlines/y2003/30may_solareclipse.html">partial eclips on May 31st.</description>
<pubDate>Fri, 30 May 2003 11:06:42 GMT</pubDate>
</item>
```

Malicious code may be injected into the above XML code using the following script:

```
<title>Liftoff News<script>alert ('Title Popup Example')
</script></title>
<link><script>alert('Link Popup Example')</script></link>
<description><script>alert('Description Popup Example')</script></description>
</item>
```

The following Table 5 shows a sample template that may be used to remove the injected code and clean up the XML code.

TABLE 5

A Sample Dynamic Template for Removing Injected Code
from a Piece of XML Code Representing a Web Feed

| Web Content Identifier | http://liftoff.msfc.nasa.gov |
|---|---|
| Malware #1 | |
| Location | element id=31758 |
| Type | harmful code |
| Rating | 6 |
| Action(s) | delete <script/> at <title/> |
| Malware #2 | |
| Location | element id=68167 |
| Type | harmful code |
| Rating | 6 |
| Action(s) | delete <script/> at <link/> |

TABLE 5-continued

A Sample Dynamic Template for Removing Injected Code
from a Piece of XML Code Representing a Web Feed

| | |
|---|---|
| Malware #3 | |
| Location | element id=68145 |
| Type | harmful code |
| Rating | 6 |
| Action(s) | delete <script/> at <description/> |

Upon receiving the template for the requested feed, the fee proxy 710 parses the XML file for the requested feed according to the template, removes any unwanted entries, and regroups the XML file 708. The sample template shown in Table 5 indicates that the three sets of script code at elements 31758, 68167, and 68145 respectively should be deleted. Finally, the feed proxy 710 sends the revised feed XML file to the client device 761.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method of providing malware-free web content to a user, comprising:
   receiving a request for a piece of web content from the user at a computer, said web content not being scanned after receiving said user request;
   obtaining the piece of web content by said computer;
   obtaining a dynamic template for the piece of web content from a database, wherein said dynamic template includes a unique identifier associated with said piece of web content, said dynamic template further including for each piece of malware in said piece of web content a location of said each piece of malware in said web content, wherein the dynamic template exists prior to said obtaining the piece of web content and indicates that the piece of web content includes malware, and wherein said dynamic template further includes for each piece of malware included in said piece of web content at least one action to be performed with respect to said each piece of malware when cleaning up the piece of web content because said malware is included in the piece of web content;
   cleaning up the piece of web content by performing the at least one action indicated in the dynamic template for said each piece of malware, the at least one action being performed after said user request; and
   providing the cleaned-up piece of web content to the user.

2. A method as recited in claim 1, wherein the dynamic template for the piece of web content further comprises:
   for each piece of malware included in the piece of web content, a type of the piece of malware, a rating of the piece of malware.

3. A method as recited in claim 1, further comprising:
   analyzing the piece of web content to identify each piece of malware included in the piece of web content; and
   constructing the dynamic template for the piece of web content by specifying at least one action to be performed with respect to each piece of malware included in the piece of web content.

4. A method as recited in claim 1, further comprising:
   obtaining an update of the piece of web content before said request for said web content from said user;
   analyzing the updated piece of web content to update the dynamic template for the piece of web content before said request for said web content from said user.

5. A method as recited in claim 1, wherein a piece of web content is one selected from the group consisting of an email message, a file, a web page, and a web feed.

6. A method as recited in claim 2, wherein one of the at least one action to be performed with respect to a piece of malware is one selected from the group consisting of add a stamp, delete, replace with pre-defined content, clean the malicious part, and remove the malicious part.

7. A method as recited in claim 3, wherein a piece of malware included in a piece of web content is identified according at least in part to at least one selected from the group consisting of a location of the piece of malware within the piece of web content, a keyword, a predefined rule, and a pattern.

8. A system for providing malware-free web content to a user, comprising:
   a web proxy server computer;
   a web content proxy application on said web server computer configured to provide a piece of web content to the user upon receiving a request from the user for the piece of web content, wherein the web content proxy application being further configured to obtain the piece of web content and a dynamic template for the piece of web content, wherein said dynamic template includes a unique identifier associated with said web content, said dynamic template further including for each piece of malware included in said piece of web content a location of said malware in said web content, wherein said dynamic template further includes for said each piece of malware included in said piece of web content at least one action to be performed with respect to said each piece of malware in order to clean up said web content, and wherein said dynamic template indicates prior to said obtaining the piece of web content that the piece of web content includes malware and that said at least one action is to be performed because malware is included in the piece of web content, said web content proxy application being further configured to clean up the piece of web content by performing the at least one action indicated in the dynamic template after said user request and to provide the cleaned-up piece of web content to the user, and wherein the dynamic template exists prior to said obtaining the piece of web content;
   a database configured to store a plurality of dynamic templates, wherein each of the plurality of dynamic template is associated with a piece of web content;
   a dynamic template provider configured to retrieve the dynamic template for the piece of web content requested by the user from the database and to forward the dynamic template to the web content proxy application; and
   a web content analyzer configured to analyze a piece of web content, to construct the dynamic template for the piece of web content, and to store the dynamic template in the database, said web content analyzer not scanning said web content after receiving said user request.

9. A system as recited in claim 8, wherein the dynamic template for the piece of web content further comprises:
for each piece of malware included in the piece of web content, a type of the piece of malware, a rating of the piece of malware.

10. A system as recited in claim 8, wherein the web content analyzer is further configured to update the dynamic template for the piece of web content based on updated information on the piece of web content.

11. A system as recited in claim 8, wherein the web content analyzer is further configured to obtain the piece of web content to be analyzed.

12. A method of constructing a dynamic template for a piece of web content, wherein the template indicates an action to be performed with respect to a selected portion of the piece of web content, comprising:
analyzing the piece of web content to identify whether one or more specific portions of the piece of web content contain unwanted data;
for each portion of the piece of web content identified as containing unwanted data, identifying a location of the portion within the piece of web content and specifying at least one action to be performed on the unwanted data when cleaning up the piece of web content;
constructing the dynamic template for the piece of web content, wherein the dynamic template includes a unique identifier for the piece of web content, the location of said each portion within the piece of web content, and the at least one action for each portion of the piece of web content identified as containing unwanted data;
storing, by a computer, the dynamic template in a database before a user request for said web content; and
providing the dynamic template to a proxy after the user request, wherein the proxy is configured to obtain the web content based on the user request and clean up the web content by performing said at least one action for said each portion, wherein the dynamic template includes the at least one action for said each portion prior to the proxy obtaining the piece of web content.

13. A method as recited in claim 12, wherein the rating assigned to each portion of the piece of web content identified as containing unwanted data is determined based on a severity level of the unwanted data.

14. A method as recited in claim 12, wherein the at least one action specified for each portion of the piece of web content identified as containing unwanted data is determined based on at least one predefined rule.

15. A method as recited in claim 12, wherein the piece of web content is a web feed represented by a XML file, and the location of each portion of the piece of web content identified as containing unwanted data is identified by an XML entry.

16. A method as recited in claim 12, further comprising:
updating the dynamic template for the web content by reanalyzing a current version of the piece of web content.

17. A method as recited in claim 12, further comprising:
receiving said user request for said web content; and
performing said at least one action after said user request, said performing being based upon said template constructed and stored before said user request.

18. The method as recited in claim 12, further comprising:
for each portion of the piece of web content identified as containing unwanted data, identifying a type of the unwanted data contained in the portion and assigning a rating to the unwanted data; and
specifying in the dynamic template the type and the rating for each portion of the piece of web content identified as containing unwanted data.

19. A method as recited in claim 15, wherein the XML file is analyzed using at least in part XPATH.

* * * * *